United States Patent [19]
Owen

[11] Patent Number: 5,665,221
[45] Date of Patent: Sep. 9, 1997

[54] ELECTRICAL APPARATUS FOR CONTROLLING LIQUID CONTAMINANTS

[75] Inventor: Bruce W. Owen, Willowick, Ohio

[73] Assignee: A Rx Technologies Inc., Willowick, Ohio

[21] Appl. No.: 758,333

[22] Filed: Dec. 3, 1996

Related U.S. Application Data

[60] Provisional application No. 60/007,994, Dec. 05, 1995.

[51] Int. Cl.$^6$ .................................................. C02F 1/46
[52] U.S. Cl. ..................... 205/695; 205/696; 205/724; 205/730; 205/742; 205/745; 204/197
[58] Field of Search .............................. 205/695, 696, 205/724, 730, 742, 745; 204/197

[56] References Cited

U.S. PATENT DOCUMENTS

| | | | |
|---|---|---|---|
| 1,608,709 | 11/1926 | Mills | 166/902 |
| 3,448,034 | 6/1969 | Craft et al. | 204/197 |
| 3,835,015 | 9/1974 | Gary | 204/197 |
| 3,891,394 | 6/1975 | Smith et al. | 23/273 |
| 3,919,068 | 11/1975 | Gary | 204/197 |
| 4,416,854 | 11/1983 | Nielsen | 205/745 |
| 4,933,089 | 6/1990 | Newton | 210/696 |
| 5,204,006 | 4/1993 | Santoli | 210/696 |
| 5,368,705 | 11/1994 | Cassidy | 205/745 |

Primary Examiner—Arun B. Phasge
Attorney, Agent, or Firm—David A. Greenlee

[57] ABSTRACT

A device is placed in a container containing flowing fluid to neutralize fluid contaminants and prevent their deposition on the walls of the container. The device includes a weak electrical current generator having an electric half-cell that forms an electric circuit with the earth-grounded container via the liquid and generates electrons to neutralize the charged contaminants. The generator includes one or more cupriferous tubes containing a mixture of vegetable oil, and powders of copper, zinc, manganese, cellulose and predominantly iron. Preferably, each tube contains:

vegetable oil—5.0–20.0%
iron powder—50.0–80.0%
copper powder—2.0–10.0%
zinc powder—2.0–10.0%
manganese powder—2.0–10.0%
cellulose powder—2.0–15.0%
trace minerals—$\leq 0.50\%$.

This device may be placed in the line of flow of a deep oil well to prevent deposition of paraffin and other contaminants onto the walls of the pipeline. The device is useful in all types of confined fluid systems which utilize flowing water, oil or glycol, such as pipelines, steam or hydronic boilers, cooling tower condensers, chillers, and water conditioners.

6 Claims, 4 Drawing Sheets

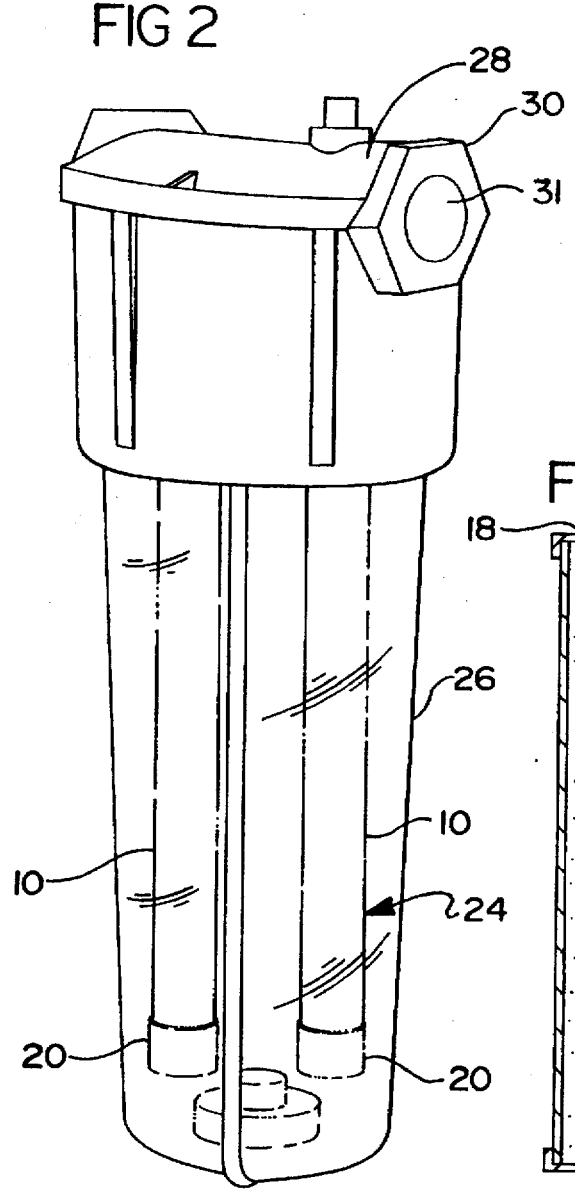
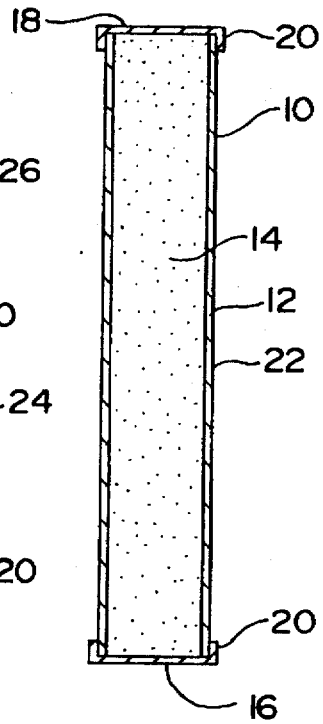
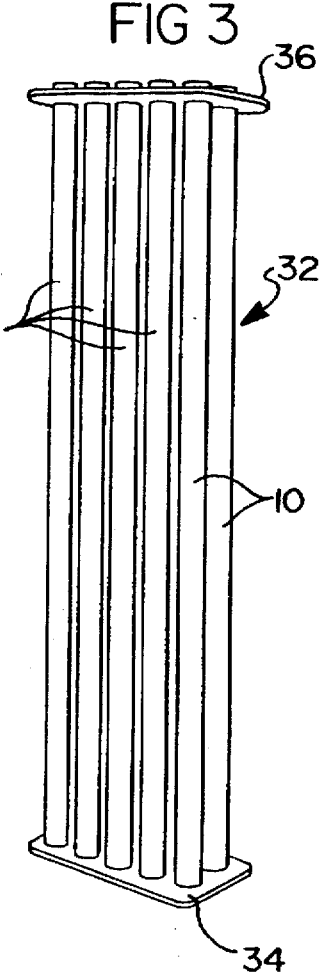
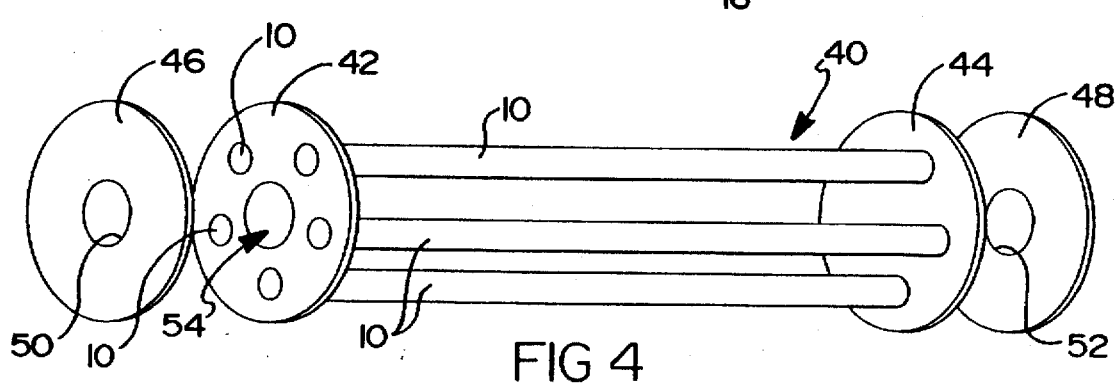

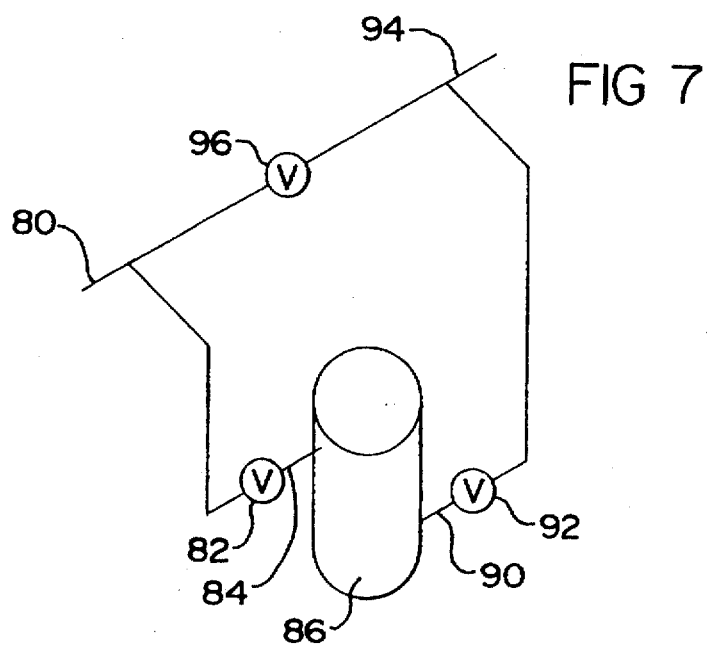
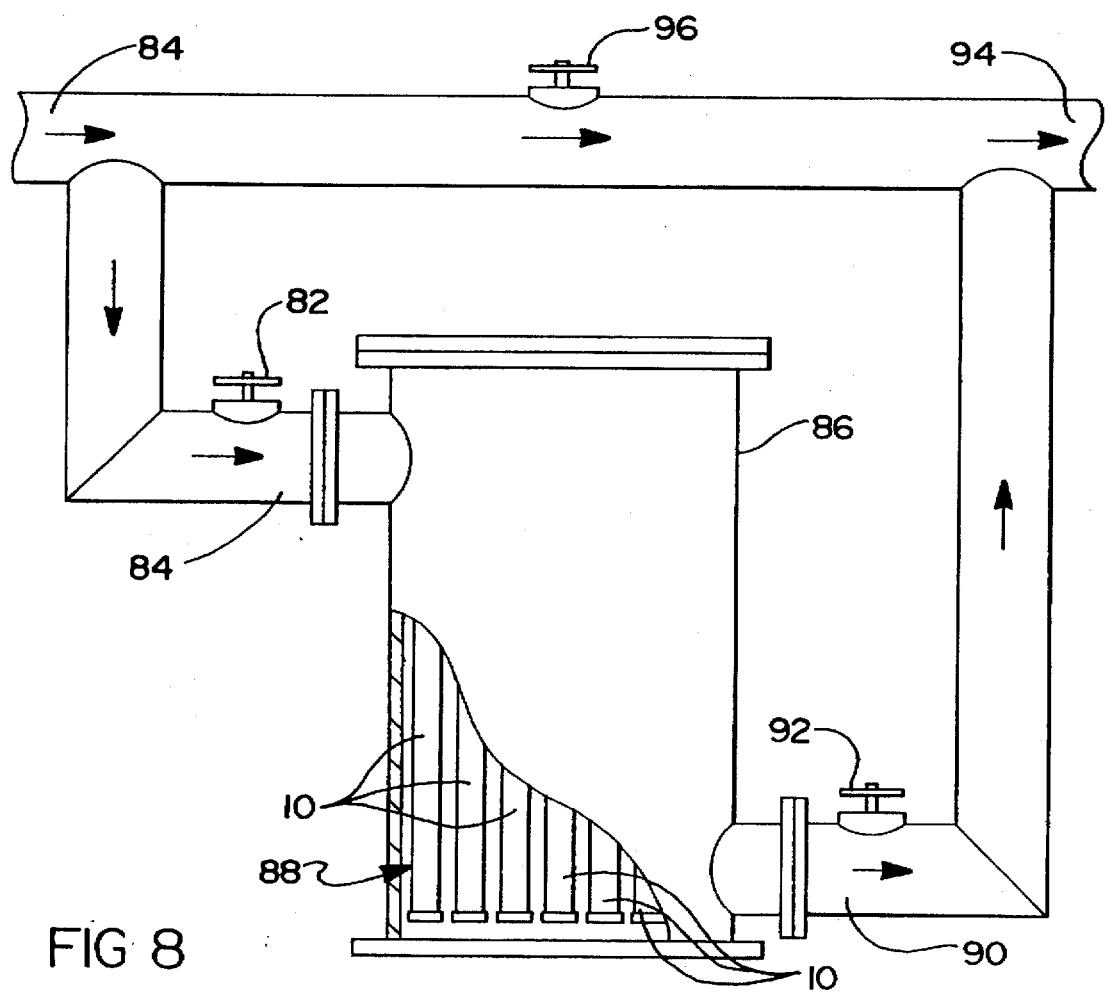

ELECTRICAL APPARATUS FOR CONTROLLING LIQUID CONTAMINANTS

RELATED APPLICATION

This application claims priority U.S. provisional application No. 60/007,994, filed Dec. 5, 1995.

FIELD OF THE INVENTION

This invention relates generally to treatment of liquids to control dissolved contaminants and, more particularly, to electrical treatment of the liquid to prevent precipitation of contaminants onto the walls of the liquid container.

BACKGROUND OF THE INVENTION

Crude oil produced from underground reservoirs often contains many entrained compounds. For example, an oil well will frequently produce large quantities of water, gas, carbon dioxide, solids and crude oil. To facilitate the pumping of the oil from an underground reservoir, devices such as gas anchors are commonly used to prevent large quantities of gas from being produced with the oil. If gas is produced with the oil, gas locks can prevent the efficient operation of the pumping mechanism. In addition, gas anchors and other devices can be used to prevent solids in the production fluids from being drawn into the pumping mechanism.

In the production of oil from an underground reservoir, paraffin compounds associated with the hydrocarbons may precipitate onto, solidify and coat the surfaces of the pumping pipes and equipment. The solidification of paraffins may be due to a lower temperature which causes the crystallization of the paraffin, or may be due to the reaction of paraffin compounds with water and other fluids produced from the reservoir. In any event, the accumulation of paraffin solids on production pipes and equipment impairs the operation of the equipment by reducing pumping efficiency and increasing production costs.

Different techniques have been developed to remove the accumulation of paraffin solids from pumping pipes and equipment. For example, U.S. Pat. No. 4,011,906 to Alexander et al discloses a device which uses hot water to remove paraffin deposits from production tubing. In U.S. Pat. No. 4,138,931 to Hermann et al, a hydraulic pump inhibits the formation of deposits by using plungers to create a fluid flow which produces a scrubbing effect on the cavity surface. In U.S. Pat. No. 194,704 to Means, water is removed from the well bore to prevent paraffin from forming in the well.

These techniques do not prevent the accumulation of paraffin deposits but are designed to remove the paraffin after it has accumulated. Accordingly, a need exists for a process and apparatus which can prevent the accumulation of paraffin deposits in pumping pipes and equipment.

In addition to the well-known problem of paraffin contamination of oil wells, the accumulation of scale on the surfaces of, as well as the corrosion of the pipes, flow tubes, pumps and other equipment is a problem with both oil and water wells. The build-up of contaminants constricts the flow the pumped fluid, decreasing the well's efficiency, and corrodes the equipment, necessitating replacement. The problem is particularly acute where the distance the fluid must be pumped is long or where the mineral content of the fluids flowing in the well system is high and the deposition of compounds of these minerals is production and economic difficulties. In addition to paraffin, particularly bothersome are compounds such as calcium carbonate/sulfate, iron oxide/sulfide, as well as hydrogen sulfide, free sulfur, and sodium salts.

Contaminant deposition is also a problem for equipment that utilizes water for cooling, heating or other treatment, such as steam or hydronic boilers, chillers, cooling towers, and humidifiers. Contaminants also present maintenance problems for cold weather cooling equipment that utilizes ethylene glycol. Scale buildup in these systems requires periodic shutdown for chemical or mechanical de-scaling and flushing.

One solution to this problem is to chemically treat the fluid; this is expensive and introduces another contaminant that must be removed, causing delays and increased costs. Another solution is to prevent deposition of precipitates of these mineral compounds. If the contaminants can be maintained in colloidal form or in suspension and prevented from depositing on the equipment walls, they will not accumulate on or corrode the tubing walls and equipment surfaces, thus eliminating the problems caused by these contaminants.

Many devices have been proposed to overcome this contaminant problem. Many of these are an inserts having specific metallurgies (predominantly copper in most) that are placed within a pipe to provide constricted or tortuous flow paths for the liquid. Such arrangements are shown in U.S. Pat. Nos. 3,448,034 to Craft; 3,919,068 to Gary; 4,933,089 to Newton; and U.S. Pat. No. 5,204,006 to Santoli. These inserts allegedly have a polarizing effect on the fluid in the tube to eliminate any affinity between the mineral compounds and the surfaces of the flow system and prevent precipitation of the compounds and prevent their deposition on the equipment walls.

U.S. Pat. No. 3,891,394 to Smith et al provides an insert which allegedly produces so-called "seed" crystals that attract deposited scale and remain in suspension in the fluid due to the turbulence created by the insert. U.S. Pat. No. 1,608,709 to Mills proposes a slightly different arrangement by providing a sacrificial insert of zinc in the fluid flow which is insulated from the fluid pipe and which corrodes in place of the pipe.

None of these inserts have become an industry standard, and thus appear to only be minimally effective in preventing scale formation and corrosion.

Another solution that has been tried in oil wells is the use of permanent magnets placed outside the pipe to induce a magnetic field within the pipe through which the oil flows. This has been found to have limited effectiveness on current oil wells.

All of the previous devices have been developed for current relatively shallow (6000 ft.) wells. There is currently a proposal to begin deep (6000 ft.) oil well drilling. This extreme length of oil travel and the depths encountered will present new problems of preventing contaminant deposition and corrosion.

It would be desirable to provide a device which provides improved contaminant neutralization in all types of confined fluid systems utilizing water, oil or glycol, such as well production, cooling, heating and humidification.

It would also be desirable to provide a device which more effectively neutralizes contaminants in a liquid to prevent their deposition on the walls of the liquid container.

It would further be desirable to provide a device which is placed in the line of flow of a deep oil well which prevents deposition of paraffin and other contaminants onto the walls of the pipeline transporting the liquid.

SUMMARY OF THE INVENTION

It is therefore an object of this invention to provide improved contaminant neutralization in all types of confined fluid systems utilizing water, oil or glycol, such as well production, cooling, heating and humidification.

Another object of this invention is to provide a device which more effectively neutralizes contaminants in a liquid to prevent their deposition on the walls of the liquid container.

Yet another object of this invention is to provide a device which is placed in the line of flow of a deep oil well which prevents deposition of paraffin and other contaminants onto the walls of the pipeline transporting the liquid.

In one aspect, this invention features a device for treating a body of liquid in a container to inhibit the precipitation of contaminants suspended in the liquid. The device includes a weak electrical current generator having an electric half-cell, including a cupriferous tube containing a mixture of vegetable oil, and powders of copper, zinc, manganese, cellulose and predominantly iron, is provided in the path of fluid flow. The half-cell forms an electric circuit with the earth-grounded container (the other half of the electrical cell) via the liquid and generates electrons to neutralize the charged contaminants and prevent their precipitation and deposition on the walls of the container.

In another aspect, this invention features a generator having a plurality of half-cells, each of which comprises a copper tube which may have a thin coating of a precious metal, such as silver or gold, to enhance electrical potential and current.

Preferably, the mixture contained in the tubes is:

vegetable oil—5.0–20.0% iron powder—50.0–80.0% copper powder—2.0–10.0% zinc powder—2.0–10.0% manganese powder—2.0–10.0% cellulose powder—2.0–15.0% trace minerals—≦0.50%.

In yet another aspect, this invention features such a device for treating oil in a pipeline to prevent contaminants from depositing onto the walls of the pipe, with the device located in a valved bypass to enable isolation for periodic cell removal for maintenance.

In still another aspect, this invention features an elongated copper tube having end caps soldered onto the tube by a tin-silver solder, if operating environment (fluid) temperatures are under 250° F., or by a silver solder for temperatures above 250° F.

A further feature of this invention is that the current generator of this invention may be used to treat a variety of fluids, including oil, water and ethylene glycol, and can be located in pipelines, steam or hydronic boilers, cooling tower condensers, chillers, and water conditioners.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is a longitudinal sectional view of a single half-cell electric generator according to this invention;

FIG. 2 is a perspective view of container two of the half-cells of FIG. 1 in a container suitable for use with a humidifier;

FIG. 3 is a perspective view of an assembly of a ten half-cells suitable for installation in a cooling tower, chiller or boiler;

FIG. 4 is a perspective view of a cartridge of five half-cells suitable for installation in a fluid pipe;

FIG. 7 is a perspective schematic view of a boiler installation having two containers of cartridges located in a valved bypass;

FIG. 8 is a sectional view of one of the containers depicted in FIG. 10, cut away to illustrate the cartridges;

DETAILED DESCRIPTION OF A PREFERRED EMBODIMENT

Figure 5:
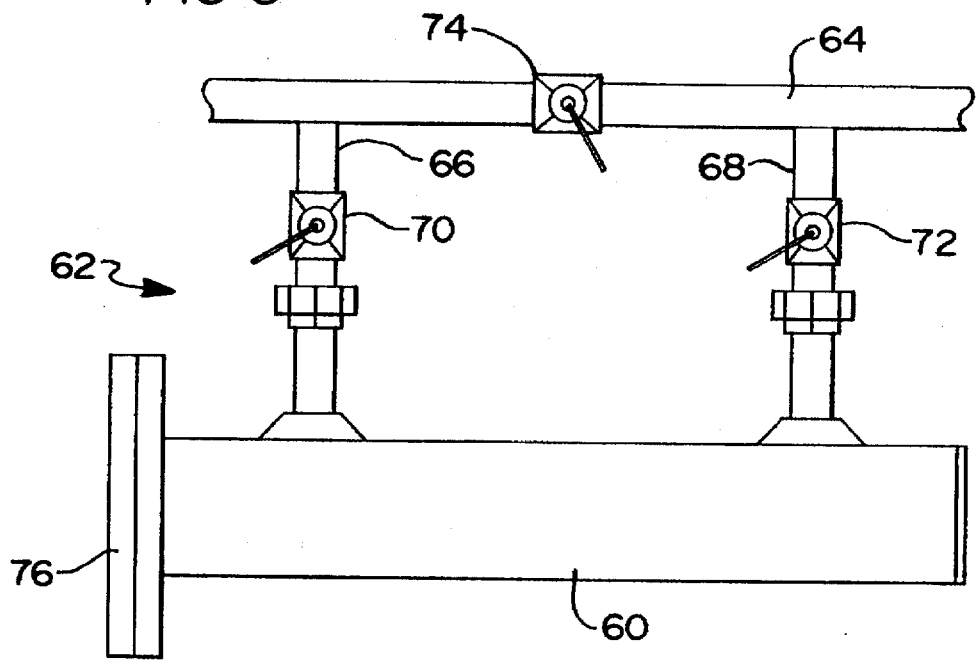
FIGS. 5 and 6 are diagrammatic views of pipeline installations which utilize the cartridge of FIG. 4.

This invention provides one or more electrical half-cells, which act as a low voltage, low current DC generator. The fluid in which the half-cells are placed acts as the electrolyte, while the grounded container acts as the other or negative half-cell to complete the electrical cell. This provides a continuing electro-chemical action with fluid contaminants, e.g.:

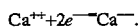

$$Ca^{++}+2e^- \rightarrow Ca^-.$$

Since this action is continuing, it is one-way, and is not reversible, as is normal. However, when the half-cells are removed, the electrical cell is destroyed and this action will reverse over a period of time.

When metal contaminants change from the ionic state to a neutral state, they cannot form compounds with the negative ions and are, therefore, held in suspension in the fluid. Paraffin that is entrained in crude oil acts similarly, also remaining in suspension in the main body of the oil.

Referring to FIG. 1, an electric half-cell 10 comprises a copper tube 12 that is completely filled with a mixture 14 (described later) to the exclusion of any air or oxygen. Tube 12 is closed at both ends by copper caps 16 and 18 which are soldered onto tube 12 by a tin silver solder 20. After soldering, the half-cell 10 is preferably electroplated with a thin coating 22 of silver or gold. A 300 microinch coating of silver has been found suitable for many water applications.

Plating affects the electrical potential of the half-cell, as does size, length number of tubes used in a given installation. For example, in one experimental test, the potential of one unplated tube assembly was measured at 700–800 millivolts, while the same assembly when silverplated developed 800–900 millivolts. When goldplated the same assembly developed 1000–1500 millivolts.

An installation of half-cells according to this invention generally comprises an assembly which employs a plurality of these half-cells 10 to create an electrical generator for generating a stream of electrons. FIG. 2 illustrates such a generator 24 comprising two half-cells 10 contained in a housing 26 which has a cap 28 that includes a fitting 30 for attachment in a home humidifier. Water to be evaporated is introduced into container 24 to be neutralized by generator 24 through opening 31 in fitting 30. FIG. 3 illustrates a generator 32 which utilizes ten half-cells 10 mounted on end plates 34 and 36 for installation in a cooling tower, chiller or boiler.

FIG. 4 depicts a circular assembly or cartridge 40 of five half-cells 10 which are mounted in circular end plates 42 and 44. Circular end caps 46 and 48 have central openings 50 and 52 which provide a central fluid flow passage 54. Cartridge 40 is suitable for installation in a water or oil pipeline, as depicted in FIGS. 5 and 6.

Figure 6:
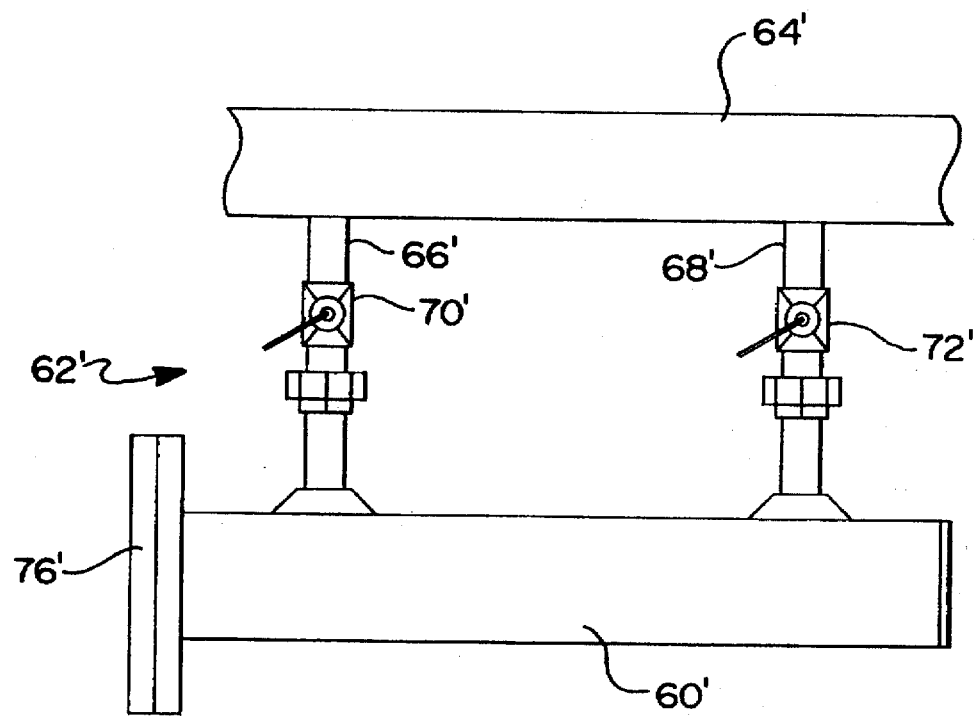

Cartridge 40 is inserted into a valved branch pipe 60 of a pipeline installation 62 shown in FIG. 5. Branch pipe 62 is connected to a main pipeline 64 by pipes 66 and 68 which carry bypass valves 70 and 72. Main pipeline 64 includes a diversion valve 74. Valves 70 and 72 are opened and valve 74 is closed to force the pumped oil or other liquid to flow through cartridge 40 in branch pipe 60. The oil flows over all the half-cells 10 before it returns to main pipeline 64.

Installation 62 includes an access plate 76, which can be conventionally attached by bolts (not shown), closing one end of branch pipe 60. Cartridge 40 is easily serviced by opening diversion valve 74 and closing branch valves 70 and 72 to isolate cartridge 40 which can then be removed by removing access plate 76 and sliding cartridge 40 out of branch pipe 60. The illustration is diagrammatic, and in an actual installation the valving can be moved to the ends and curved in and out to reduce fluid friction and increase pumping efficiency. Alternatively, the FIG. 6 embodiment, without a diversion valve, could be used. In the FIG. 6 installation, elements similar to those in FIG. 5 are designated with primed numbers.

The water in steam boilers can be treated with half-cells 10 in the form of cartridge 40, which completes the half-cells, or half-cells 10 can be placed in the condensate/feed water tank using the tank as the other or negative half-cell. Such an installation is shown in FIGS. 7 and 8. Here, water flowing through an incoming line 80 flows through an isolation valve 82 and an inlet 84 into a tank 86 containing an array 88 of cells 10, similar in size to that shown in FIG. 3, and in shape to that shown in FIG. 4, where the contaminants are removed.

Cleaned water exits tank 86 through an outlet pipe 90 and another isolation valve 92 into a boiler feed line 94 for return to a boiler, not illustrated. A normally-closed connector valve 96 can be opened to connect lines 80 and 94 during periods when isolation valves 82 and 92 are closed for maintenance or replacement of the arrays of cells 88.

Half-cells 10 can be placed inside the normal pipe in a hydronic boiler to treat a portion of the circulating water; this will eventually treat the entire volume. Continual water treatment must continue to keep the metals dissolved in the water at zero valence.

When half-cells 10 of generator 24 (FIG. 2) are used to treat water before humidification, the contaminant minerals do not form compounds, but remain in suspension. They must be removed by bleedoff at regularly timed intervals to keep the water from becoming saturated with suspended contaminants and precipitating out of solution.

The half-cells are placed in an insulated rack in the basin of a cooling tower condenser system. Because of evaporation in a cooling tower, the solids are left behind and the concentration increases to saturation wherein the metals precipitate and settle as a sludge. These metals are then removed at regularly scheduled bleedoff operations.

It has been found that ethylene glycol, when used in solution in chilled water systems, will tend to become dirty and viscous with a "gunk" of contaminants and consequently lose its free flowing qualities. However, the later addition of half-cells 10 in a filter in the system will remove the gunk so that the liquid eventually returns to its original color and remains corrosion inhibited. If initially installed in such a system, half-cells 10 prevent formation of the sludge.

DESCRIPTION OF OPERATION

The following is a three level description of the action of half-cells in steel (or iron or any electrically conducting medium) containment systems containing water in liquid form. These three levels can be classified as the 1) macroscopic, 2) microscopic and 3) quantum mechanical levels. All three levels occur simultaneously and the action of the half-cells is the sum of these three descriptions, which will relate to an exemplary installation in a steel boiler, as shown diagrammatically in FIGS. 9, 10 and 11. Operation will be the same in a pipeline or other form of containment.

Macroscopic Level

Figure 9:
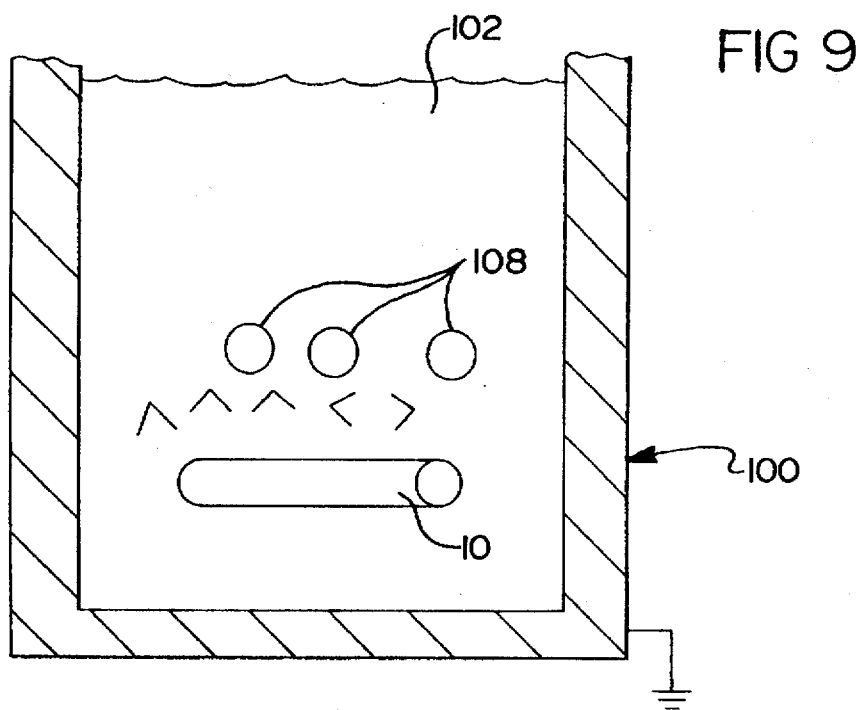
FIG. 9 is a schematic representation of an electrical circuit formed by use of the half-cell of this invention in a contained body of liquid.
Figure 10:
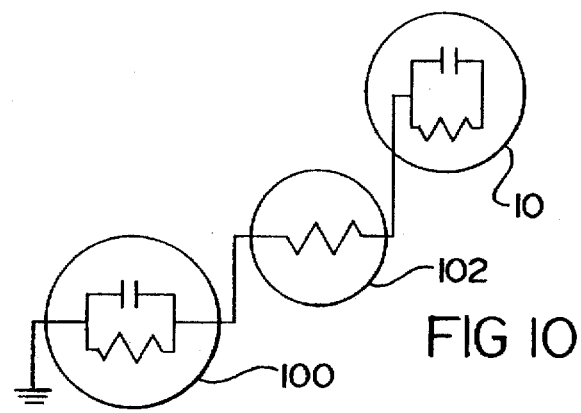
FIG. 10 is a schematic representation of the full cell formed by the half-cell of this invention, the liquid and the container.

The system is a steel boiler 100 containing a volume of water 102 and half-cells 10 (only one illustrated in FIG. 9). At the macroscopic level, the system can be modeled as an electrical circuit (FIG. 10). The half-cells provide a steady current of electricity at a low voltage of about 0.7 volts. The water in the containment acts as a dielectric medium with impurities that function as charge carriers and therefore conduct the electricity with a given resistance that depends on the volume of water and the exact configuration of the container.

The walls of the container act as a conductor of the electricity to the ground of the system. The walls of the container are metallic and are not ideal conductors, therefore, they have a characteristic resistance. The walls of the container and the half-cells themselves, in theory, have capacitances. If the ground of the system is a real earth ground, then the walls of the container will have a zero capacitance as charges that enter the walls of the container will promptly be transported to the ground.

If, however, the ground of the container is not a real earth ground but rather a floating ground the stray currents that run in the walls will have a capacitance. This capacitance will create a charge buildup at the walls of the container. Due to this charge buildup the performance of the half-cells will be impaired and, in the worst case, completely eliminated. The capacitance of the half-cells themselves cause an electrical charge of low potential difference to buildup on the half-cells so that a current may be freely transferred in to the surrounding water through which it is accelerated toward the walls of the container which is at a lower electrical potential.

Figure 11:
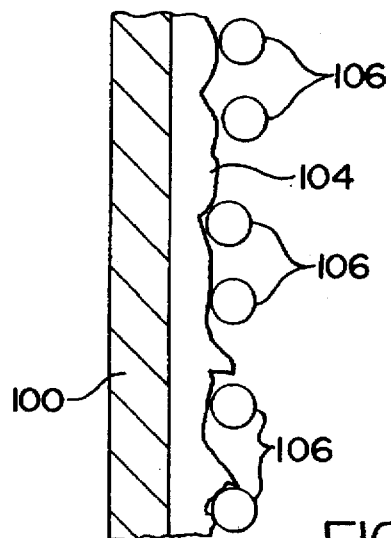
FIG. 11 is a schematic representation of the electrical charges built up on scale formed on a container wall.

FIG. 11 illustrates a buildup of impurity deposit, or scale 104 on the wall of container 100. For purposes of discussion, scale will be considered to be specifically calcium carbonate, although it applies to other contaminants as well. When cell 10 is placed in the system there is a buildup of positive charges 106 on the outside of scale 104. The scale 104 and the walls of the container 100 function as a capacitor. Some of the charge carriers 106 migrate through the scale and reach the walls of container 80 where they are neutralized. In the process of reaching the walls of the container the charge carriers actually aid in the breaking up of the scale. This will be further described in the microscopic description of cell operation.

The charging of the walls of the container is the reason cell current is initially higher than its equilibrium value. Hence, we can see from the macroscopic view of the system that the container walls must be grounded to a real earth ground and that the accumulation of charge carriers at the surface of the container creates an electric field around scale deposits, that function as a capacitor.

Microscopic Level

One of the key insights of the microscopic description of the action of half-cells 10 in a water container where scale has accumulated is described above. The effect of half-cells 10 in such a system is to cause a buildup of charge carriers 106 at the surface of the scale (FIG. 11) Occasionally, a charge carrier will penetrate the scale buildup and be neutralized by the container wall. The effect on the scale (or any material) buildup will be to break it up. Essentially the charge carriers bombard the scale millions and millions of times, each time breaking the scale deposit up into smaller and smaller grains of scale.

The cumulative effect of the charge carrier bombardment over a period of time is to change the scale deposit from a solid hard coating into a muddy silt-like deposit that can easily be wiped away. The appearance of the surface will not be affected by this microscopic interaction and so it may appear that the half-cells have had little or no effect. Hence, it is important to periodically drain off the dissolved scale to remove the scale buildup when the half-cells are first put into use.

Another microscopic effect is the neutralization of hydronium ions ($H_3O^+$) 108 at the surface of a half-cell (FIG. 9). In an acidic water source, e.g. a water source whose Ph is less than 7.0, there is an excess of hydronium ions compared to hydroxide ions ($OH^-$). Collisions of the hydronium ions with the surface of the half-cell will result in the neutralization of the hydronium ions and hence an increase in the Ph of the water system.

In summary, the action at the microscopic level in the cell in the system considered is to break up scale deposits 84 by the bombardment of the deposits by charge carrying ions. The half-cells also result in the raising of the Ph of acidic water by the neutralization of hydronium ions. It is clear from the microscopic description that, if the system has a water flow, the half-cells will have a similar effect upstream as they have downstream. This occurs because the charge carriers move at velocities much greater than the velocity of the water flow rate and are able to swim upstream and create their characteristic effects.

Quantum Mechanical Level

At the quantum mechanical level, half-cells 10 create and intensify a highly directional magnetic field. It is quite possible that this magnetic field has a subtle, but vital role in the cumulative effect of the half-cells. The magnetic field from the cell is directed along the axis of the cell, like the magnetic field of a solenoid. Therefore, the magnetic field "selects" a preferred direction in the system. The interaction of the magnetic field and the orbital angular momentum of electrons in calcium atoms, for example, tends to render the calcium atoms less reactive than they would be if the magnetic field was removed.

The essential action of the magnetic field of the half-cells is to lower the energy of the atomic orbital that is in the direction of the field. In calcium, this entails the pairing of valence electrons in a single atomic orbital situation that, without the field, would be of higher energy than the more reactive state in which the valence electrons share the same spin quantum number, but belong to different atomic orbits. This suggests that one way to ensure the efficiency of the half-cells is to increase the iron content of the half-cells at the expense of other materials such that the other materials are still sufficient to produce the appropriate voltage over a sufficient period of time.

Summary of Operation

At macroscopic level, the half-cells interact with the walls of the container to create an electrical circuit whose capacitance tends to degrade the deposit of impurities on the surfaces of the container. Grounding of the container to a real earth ground is essential to the proper functioning of the half-cells. At the microscopic level, the migration of charge carriers across the impurity deposit tends to physically break up the deposit itself. At the quantum mechanical level the highly directional magnetic field produced by the half-cells may play a significant role in the efficiency with which the half-cells decrease impurity deposition on container walls.

While only a preferred embodiment of this invention has been illustrated and described, obvious modifications thereof are contemplated within the scope of the following claims.

I claim:

1. A device for treating a body of liquid flowing through a container to inhibit the precipitation of contaminants suspended in the liquid, comprising means electrically grounding the container, a weak electrical current generator having an electric half-cell, including a cupriferous tube containing a mixture of vegetable oil, and powders of copper, zinc, manganese, cellulose and predominantly iron, and means locating said tube in the path of fluid flow, said half-cell forming an electric circuit with the grounded container via the liquid and generating electrons to neutralize the charged contaminants and prevent their precipitation and deposition on the walls of the container.

2. The device of claim 1, wherein the current generator comprises a plurality of said half-cells, each of which comprises a copper tube having a thin coating of a precious metal to enhance electrical potential and current.

3. The device of claims 1 or 2, wherein the mixture contained in the tubes is:

vegetable oil—5.0–20.0% iron powder—50.0–80.0% copper powder—2.0–10.0% zinc powder—2.0–10.0% manganese powder—2.0–10.0% cellulose powder—2.0–15.0% trace minerals—$\leq 0.50\%$.

4. The device of claim 1, wherein said tube is an elongated copper tube having end caps soldered onto the tube by a tin-silver solder, when said device is used in an operating environment having temperatures under 250° F., or by a silver solder when said device is used in an operating environment having temperatures above 250° F.

5. A method of treating oil in a pipeline to prevent contaminants contained in the oil from depositing onto the walls of the pipe, comprising the steps of a. providing a weak electrical current generator having an electric half-cell, including a cupriferous tube containing a mixture of vegetable oil, and powders of copper, zinc, manganese, cellulose and predominantly iron, and means locating said tube in the path of fluid flow, b. providing a valved bypass for said pipeline, c. locating said device within said valved bypass to enable isolation for periodic cell removal for maintenance, and d. normally opening said bypass for oil flow therethrough to enable the device to neutralize the charged contaminants and prevent their precipitation and deposition on the walls of the pipeline.

6. A method of treating liquid in a liquid circulation system, having a liquid transmission pipe, to prevent contaminants contained in the liquid from depositing onto the walls of the pipe, comprising the steps of a. providing a weak electrical current generator having at least one electric half-cell, including a cupriferous tube containing a mixture of vegetable oil, and powders of copper, zinc, manganese, cellulose and predominantly iron, and means locating said tube in the path of liquid flow, b. providing a valved bypass for said pipe, c. locating said device within said valved bypass to enable isolation for periodic cell removal for maintenance, and d. normally opening said bypass for liquid flow therethrough to enable the device to neutralize the charged contaminants and prevent their precipitation and deposition on the walls of the pipe.

* * * * *